United States Patent
Okuda et al.

(10) Patent No.: US 6,846,006 B2
(45) Date of Patent: Jan. 25, 2005

(54) VEHICULAR AIR BAG DEVICE

(75) Inventors: Yorihito Okuda, Tokyo (JP); Katsumi Kawamoto, Tokyo (JP); Yasuhiro Yamamoto, Tokyo (JP); Hiroshi Ogawa, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 36 days.

(21) Appl. No.: 10/085,124

(22) Filed: Mar. 1, 2002

(65) Prior Publication Data
US 2002/0121768 A1 Sep. 5, 2002

(30) Foreign Application Priority Data
Mar. 2, 2001 (JP) .................................... P2001-058152

(51) Int. Cl.⁷ ............................................. B60R 21/20
(52) U.S. Cl. ................................ 280/728.3; 280/732
(58) Field of Search ............................ 280/728.3, 732, 280/728.1

(56) References Cited

U.S. PATENT DOCUMENTS

| | | | | |
|---|---|---|---|---|
| 5,301,966 A | * | 4/1994 | Sakata | ........................ 280/732 |
| 5,350,191 A | * | 9/1994 | Kokeguchi et al. | ......... 280/752 |
| 5,456,487 A | | 10/1995 | Daris et al. | |
| 5,941,558 A | * | 8/1999 | Labrie et al. | ................ 280/732 |
| 6,086,091 A | | 7/2000 | Heinz et al. | |
| 6,402,189 B1 | * | 6/2002 | Gray et al. | .................. 280/732 |

FOREIGN PATENT DOCUMENTS

| | | | | |
|---|---|---|---|---|
| DE | 197 35 438 A1 | 2/1999 | | |
| DE | 200 09 378 U1 | 9/2000 | | |
| GB | 2 347 120 A | 8/2000 | | |
| JP | 6-107103 | * | 4/1994 | .............. 208/728.3 |
| JP | 6-144141 | * | 5/1994 | .............. 280/728.3 |

* cited by examiner

Primary Examiner—Eric Culbreth
(74) Attorney, Agent, or Firm—Foley & Lardner LLP

(57) ABSTRACT

In a vehicular air bag device which has a door member that is disposed on the rear face of an air bag lid portion, and that is pressed by an inflation pressure of an air bag body to be swung via a hinge portion, thereby forming an inflation opening in the air bag lid portion, a first hinge portion and a second hinge portion are disposed as the hinge portion. The second hinge portion is bent in a stage where the inflation pressure of the air bag body is lower than a predetermined value, to cause formation of the inflation opening to be started.

10 Claims, 5 Drawing Sheets

VEHICULAR AIR BAG DEVICE

BACKGROUND OF THE INVENTION

1. Field of the Invention

The present invention relates to a vehicular air bag device which is to be disposed in a vehicle such as an automobile, and more particularly to a hinge structure of a door member.

2. Description of the Related Art

A vehicle such as an automobile is provided with an air bag device as safety means for a collision of the vehicle. Such an air bag device operates in the following manner. When an impact force which is larger than a predetermined level is applied to the vehicle body by a collision of the vehicle, the air bag body which is housed in a folded condition in an interior part such as an instrument panel is inflated toward a passenger in a cabin by supplying a high-pressure gas from an inflator, to receive the passenger, thereby protecting the passenger from a secondary collision against the instrument panel or the like.

The air bag body is configured so as to, when inflated, press an air bag lid portion which is made of a resin, and which is formed in the instrument panel or the like, whereby a score groove which is previously formed in the rear face of the air bag lid portion is broken and a door piece is opened. As a result, an inflation opening is formed so that the air bag body can be inflated toward the passenger in the cabin.

In the air bag device, a door member made of a metal is disposed on the rear face side of the door piece, whereby conflicting functions of ensuring the strength which can withstand the pressing force exerted from the surface side of the single-layer or multi-layer resin-made air bag lid portion, and of ensuring the breaking at the score groove are enabled to be inconsistent with each other.

Recently, an air bag device having the following configuration is proposed. An inflator is designed so as to cope with both a conventional operation mode (in which the whole of a predetermined amount of gas is ejected by a single ejecting operation) and a multi-stage operation mode (in which a predetermined amount of gas is stepwise ejected by plural ejecting operations), and to be selectively set to the conventional operation mode or the multi-stage operation mode. In the proposed air bag device, however, a special hinge structure is required which can cope with both the conventional operation mode and the multi-stage operation mode of the inflator.

When the hinge portion is set to have a large flexural rigidity which can withstand a high inflation pressure of the air bag body in the conventional operation mode of the inflator, the hinge portion is hardly bent by a low inflation pressure of the air bag body exerted by a first-stage gas ejection operation in the multi-stage operation mode of the inflator, thereby producing the possibility that a predetermined inflation opening cannot be satisfactorily formed in an air bag lid portion. By contrast, when the hinge portion is set to have a small flexural rigidity at which the hinge portion can be bent by a low inflation pressure of the air bag body exerted by a first-stage gas ejection operation in the multi-stage operation mode of the inflator, there arises the possibility that the hinge portion is broken by a high inflation pressure of the air bag body in the conventional operation mode of the inflator. As a result, hinge rotation of the door piece which is formed in the air bag lid portion may not be satisfactorily conducted.

SUMMARY OF THE INVENTION

In view of the above discussed problem, it is an object of the invention to provide a vehicular air bag device provided with a simple hinge structure which can cope with both the conventional operation mode and the multi-stage operation mode of an inflator.

In order to achieve the above object, according to a first aspect of the invention, in a vehicular air bag device which has a door member that is disposed on a rear face of an air bag lid portion, and that is pressed by an inflation pressure of an air bag body to be swung via a hinge portion, thereby forming an inflation opening in the air bag lid portion, the hinge portion is configured by a first hinge portion, and a second hinge portion which is disposed on a door member open-end side of the first hinge portion, and the second hinge portion is bent in a stage where the inflation pressure of the air bag body is lower than a predetermined value, to cause formation of the inflation opening to be started.

According to the first aspect of the invention which is configured as described above, in the conventional operation mode of the inflator, the second hinge portion is bent in an initial stage in which the inflation pressure of the air bag body is lower than the predetermined value, and formation of the inflation opening in the air bag lid portion is started. When the inflation pressure of the air bag body then reaches a predetermined higher value, the first hinge portion in which the hinge axis is adjacent to the second hinge portion is bent, and the first and second hinge portions cooperate to form the predetermined inflation opening in the air bag lid portion without breaking the second hinge portion. By contrast, in the multi-stage operation mode of the inflator, the second hinge portion is bent by a low inflation pressure of the air bag body in a first gas ejection stage, and formation of the inflation opening in the air bag lid portion is started. Even when a low inflation pressure of the air bag body in the gas ejection of a second gas ejection stage is applied to the hinge, the first hinge portion is not substantially or completely bent, and a predetermined inflation opening is formed by only the second hinge portion. In this way, the simple hinge structure can cope with both the conventional operation mode and the multi-stage operation mode of the inflator.

A second aspect of the invention is characterized in that a recess which increases an axis-to-axis distance between hinge axes of the first and second hinge portions is formed in a basal area of the first hinge portion.

According to the second aspect of the invention which is configured as described above, the axis-to-axis distance between hinge axes of the first and second hinge portions is increased by the recess which is formed in the basal area of the first hinge portion, thereby allowing a required flexural rigidity to be ensured in the first hinge portion by a simple structure.

A third aspect of the invention is characterized in that the first hinge portion is formed into a tapered shape which is inclined toward a side of a door member fixing end as moving from the second hinge portion in a lateral width direction of the door member.

According to the third aspect of the invention which is configured as described above, since the first hinge portion is formed into a tapered shape which is inclined toward the side of the door member fixing end as moving from the second hinge portion toward the outer side in the vehicle's width direction, it is possible to ensure the flexural rigidity of the first hinge portion by a part in the vehicle's width direction.

A fourth aspect of the invention is characterized in that a weakened portion is disposed in each of both sides of a door portion of the door member.

According to the fourth aspect of the invention which is configured as described above, since the weakened portion is disposed in both the sides of the door portion of the door member, the door portion is bent in the weakened portions disposed in both the side areas of the door portion when the center area of the door portion is pressed more strongly by the inflated air bag body than the side areas. Therefore, stress concentration in the second hinge portion which is in the center area of the door member is relaxed.

A fifth aspect of the invention is characterized in that the second hinge portion is disposed in each of a center area and both side areas of the door member.

According to the fifth aspect of the invention which is configured as described above, the second hinge portion is disposed in each of the center area and both the side areas of the door member. Even when the center area of the door portion is pressed more strongly by the inflated air bag body than the side areas, therefore, the whole of the door portion is caused to perform hinge rotation by the second hinge portions disposed in both the side areas of the door member. As a result, it is possible to prevent stress from concentrating only in the second hinge portion in the center area of the door member.

DETAILED DESCRIPTION OF THE PREFERRED EMBODIMENTS

Now, a description will be given in more detail of preferred embodiments of the invention with reference to the accompanying drawings.

Embodiment 1

Hereinafter, Embodiment 1 of the invention will be described with reference to an illustrated example.

FIGS. 1 to 4 show Embodiment 1 of the invention.

Figure 1:
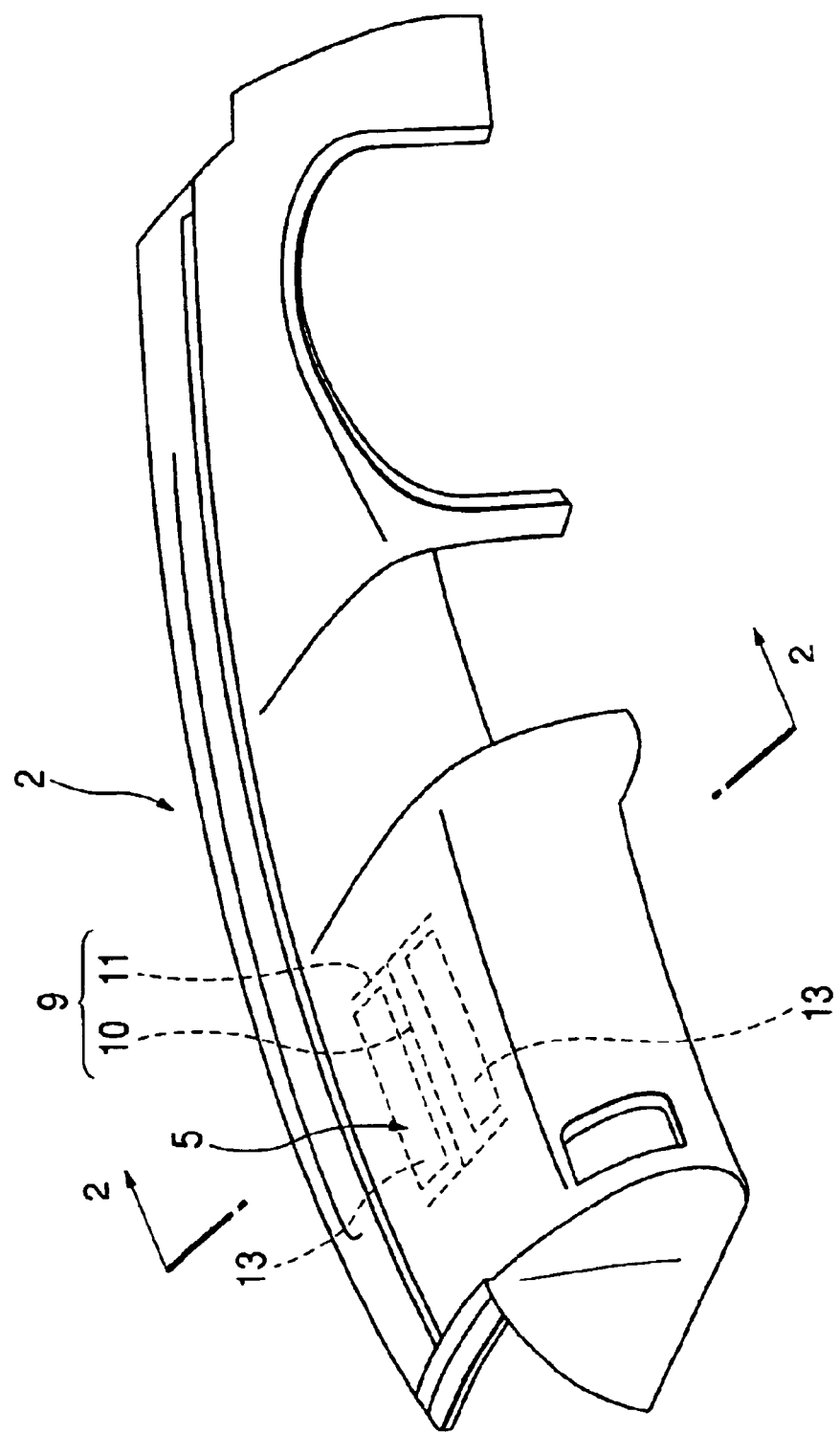
FIG. 1 is a perspective view of an instrument panel in Embodiment 1 of the invention.
Figure 2:
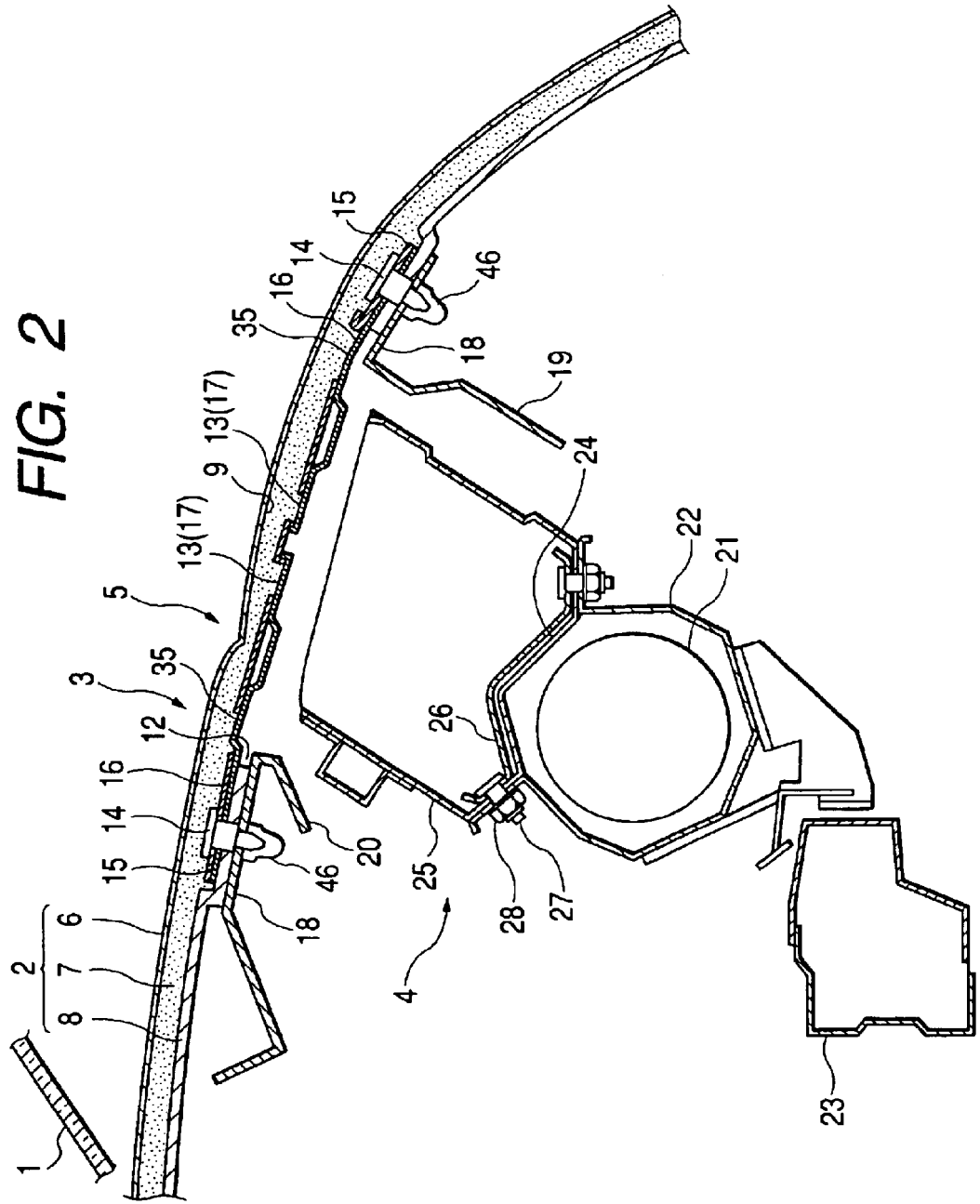
FIG. 2 is a section view taken along the line 2—2 in FIG. 1.

First, the configuration will be described. As shown in FIGS. 1 and 2, an air bag device 3 is disposed in a portion of an instrument panel 2 which is positioned below a front window glass 1 of an automobile, the portion being on the side of the passenger seat. The air bag device 3 is configured by: an air bag module 4 which houses the air bag body (not shown) and is placed inside the instrument panel 2, and which is described later; and a lid portion 5 which forms an inflation opening for allowing the air bag body to be inflated, in a portion of the instrument panel 2. The lid portion 5 is molded integrally with the instrument panel 2. Alternatively, a configuration may be employed in which the lid portion is molded separately from the instrument panel, and then attached to the panel in a subsequent step.

The instrument panel 2 and the lid portion 5 are configured into a three-layer structure in which a skin 6 made of Thermoplastic Elastomer Olefin (TEO) or the like, a foamed layer 7 made of Polyurethane (PU) or the like, and a core member 8 made of a Polypropylene Composite (PPC) (for e.g., a composite of polypropylene and materials such as synthetic rubber and corks) or the like are integrally formed in this sequence with starting from the surface. Alternatively, the instrument panel 2 and the lid portion 5 may have a single-layer structure formed only by the core member 8, or a multi-layer structure in which a multi-layer laminated sheet configured by a skin layer, a foamed layer, and a backing layer is bonded to the core member 8. The instrument panel 2 of the three-layer structure is molded by setting the skin 6 and the core member 8 which are previously shaped, into a foaming mold that is not shown, and then injecting and foaming a foaming material constituting the foamed layer 7 between the skin 6 and the core member 8.

Before the skin 6 is set into the foaming mold, a score groove 9 is previously formed in a portion of the skin 6 which will constitute the lid portion 5. The score groove 9 is configured by portions such as a thinned portion which is processed by thinning with partly leaving the skin 6 in the rear face. The thinned portion is appropriately formed by applying a process such as knife cutting, ultrasonic cutting, or laser cutting on the rear face of the skin 6. In Embodiment 1, the score groove 9 consists of one lateral score groove portion 10 which elongates substantially in the vehicle's width direction, and two longitudinal score groove portions 11 which elongate in parallel in the vehicle's longitudinal direction. The two longitudinal score groove portions respectively touch the ends of the lateral score groove portion 10, so that the score groove has a substantially H-like shape in a plan view. Alternatively, the two longitudinal score groove portions 11 in Embodiment 1 may be omitted so that the score groove 9 has a substantially linear shape in a plan view. In another embodiment, the score groove may be formed into a substantially U-like shape in a plan view.

Figure 3:
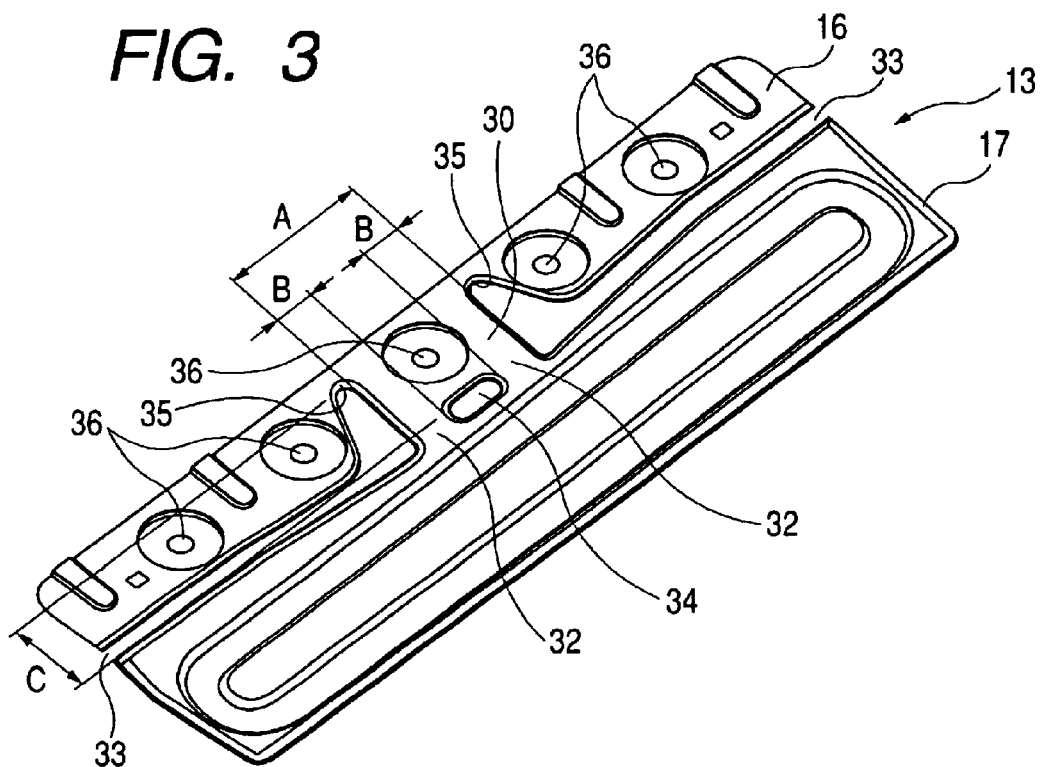
FIG. 3 is a perspective view of a door member of FIG. 2.

Before the core member 8 is set into the foaming mold, a substantially rectangular opening 12 is previously formed in a portion of the core member which will constitute the lid portion 5. A door member 13 which is made of a metal or a resin is attached to the opening 12 via an insert member 15 having plural stud bolts 14, and nuts 46 which are screwed to the stud bolts 14, respectively. In the case where the score groove 9 has a substantially H-like shape or a substantially straight line shape in a plan view, two door members 13 are attached to be arranged in the vehicle's forward and backward direction as shown in the figure. As shown in FIGS. 1 and 2, the lateral score groove portion 10 corresponds to an area between open-end sides of the two door members 13, and the two longitudinal score groove portions 11 correspond to areas between both the sides of the door members 13 and both the side edges of the opening 12, respectively. As shown in FIG. 3, each of the door members 13 comprises: an attaching portion 16 serving as a door member fixing end which is to be fixed to the front or rear edge portion of the opening 12 by the stud bolts 14; and a door portion 17 which is to be positioned in the opening 12.

In the case where the score groove has a substantially U-like shape in a plan view, only one door member 13 is attached. Also in this case, the score groove having a substantially U-like shape in a plan view corresponds to a peripheral edge portion of the door member 13. Alternatively, the attachment of the door member 13 may be conducted while omitting the insert member 15.

A reinforcement frame member 18 which is made of a metal or a resin is attached to the rear face of the core member 8 by using the stud bolts 14. Protruding reinforcement pieces 19 and 20 which extend toward the inner side with respect to the instrument panel 2 are formed on a peripheral edge portion of the reinforcement frame member 18 corresponding to the opening 12.

On the other hand, the air bag module 4 comprises a base member 22 which is made of, for example, a metal, which has a substantially inverted Ω-like shape as seen from a lateral side, and in which a cylindrical inflator 21 can be housed. The base member 22 is fastened and fixed to a vehicle body member 23 such as a steering support member by using fastening members such as bolts which are not shown. The inflator 21 is configured so as to cope with both a conventional operation mode (in which the whole of a predetermined amount of gas is ejected by a single ejecting operation) and a multi-stage operation mode (in which a predetermined amount of gas is stepwise ejected by plural ejecting operations), and also to be selectively set to the conventional operation mode or the multi-stage operation mode.

The air bag module 4 further includes an air bag container 25 which is made of, for example, a metal. The container 25 is fixed to an upper portion of the base member 22 by welding or the like. A diffuser opening 24 which communicates with the base member 22 is formed in the bottom of the container. The air bag body is housed in a folded condition in the air bag container 25. The air bag body is fixed to the air bag container 25 via a retainer 26 which is made of a metal, and which is inserted into a gas introducing port of the air bag body, by screwing nuts 28 to retainer bolts 27 that are protruded from the retainer 26.

Next, a hinge structure which is characteristic of the invention will be described. In the hinge structure in Embodiment 1, a first hinge portion 30 having a flexural rigidity which is smaller than that of a single hinge portion in the conventional art and larger than that of a second hinge portion 32 that will be described later, and the second hinge portion 32 having a flexural rigidity which is smaller than that of the first hinge portion 30, and which is bent in a stage where the inflation pressure of the air bag body is lower than a predetermined value, to cause formation of the inflation opening to be started are formed between the door portion 17 of the door member 13 and the attaching portion 16 where the door member is attached to the air bag lid portion 5.

Specifically, as shown in FIG. 3 (although only one of the two door members 13 is shown in FIG. 3, also the other door member is configured in the same manner), the first hinge portion 30 and the second hinge portion 32 are disposed in a substantially center position in the vehicle's width direction of the door member 13 which is approximately rectangular. The first hinge portion 30 and the second hinge portion 32 are configured by forming slits 33 which elongate from the both sides to the center portion in the boundary between the door portion 17 and the attaching portion 16.

The second hinge portion 32 is disposed on the side of the first hinge portion 30 which is on the open end side of the door member 13. The width (twice the dimension B) of the second hinge portion 32 is set to be smaller than the width (the dimension A) of the first hinge portion 30. In order to realize this, as shown in FIG. 3, an oblong hole 34 is formed in the center of the area corresponding to the width (A) of the first hinge portion 30 so as to form two subportions constituting the second hinge portion 32 on both sides of the oblong hole 34. Alternatively, two or more oblong holes 34 may be formed to divide the second hinge portion 32 into three or more subportions.

Recesses 35 which ensure an axis-to-axis distance C between the hinge axes serving as a large bending length for allowing the first hinge portion 30 to be bent from the second hinge portion 32 are formed in the basal area of the first hinge portion 30 by forming cutaway portions extending from ends of the slits 33 toward the attaching portion 16. Bolt holes 36 through which the stud bolts 14 of the insert member 15 that is disposed adjacently to the attaching portion 16 are to be passed are formed in the attaching portion 16. One bolt hole is formed between the pair of recesses 35, and two bolt holes are formed in each of the side portions with respect to the recesses 35.

The invention is not restricted to the configuration of Embodiment 1 described above, as far as the flexural rigidity of the second hinge portion 32 is set so that, in the conventional operation mode or the multi-stage operation mode of the inflator 21, the second hinge portion is bent in a stage where the inflation pressure of the air bag body is lower than a predetermined value, to cause formation of the inflation opening to be started, and the flexural rigidity of the first hinge portion 30 is set so that, in the conventional operation mode of the inflator 21, the first hinge portion is bent after the second hinge portion 32 is bent, to cooperate with the second hinge portion 32 to absorb a predetermined inflation pressure of the air bag body so that the second hinge portion 32 is not broken, and, in the multi-stage operation mode of the inflator 21, the first hinge portion is slightly bent or not substantially bent. For example, the dimensions such as the width and the length, the material, and the like may be adequately changed. A modification such as that the bolt hole 36 between the paired recesses 35 is omitted to enhance the flexural rigidity of the first hinge portion 30 may be appropriately conducted.

Next, the function of Embodiment 1 will be described.

When the inflator 21 operates, a high-pressure gas is ejected from the inflator 21, and then introduced into the air bag body.

The air bag body is inflated in accordance with the introduction of the high-pressure gas. First, a part of the lid portion 5 is broken to split along the H-like score groove 9 to open the lid portion 5, thereby forming the inflation opening. At the same time, the air bag body is inflated through the inflation opening toward the obliquely rearward side of the vehicle body (toward the passenger in the cabin). As a result, the air bag body receives the head or the like of the passenger sitting in a fixed position on the passenger seat, to protect the head or the like so as not bump against the instrument panel 2, etc.

Figure 4:
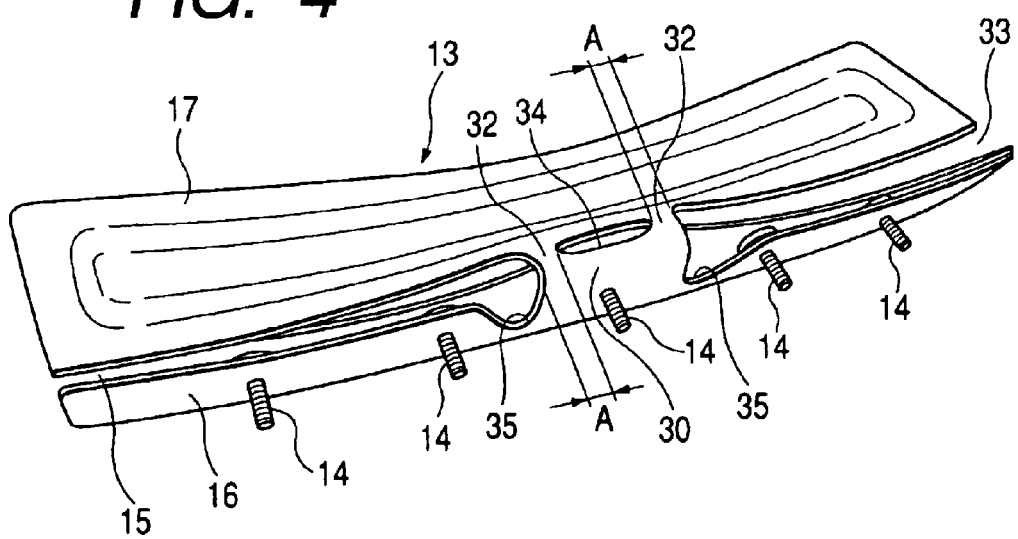
FIG. 4 is a perspective view showing a developed state of the door member and viewed from a lower side.
Figure 5:
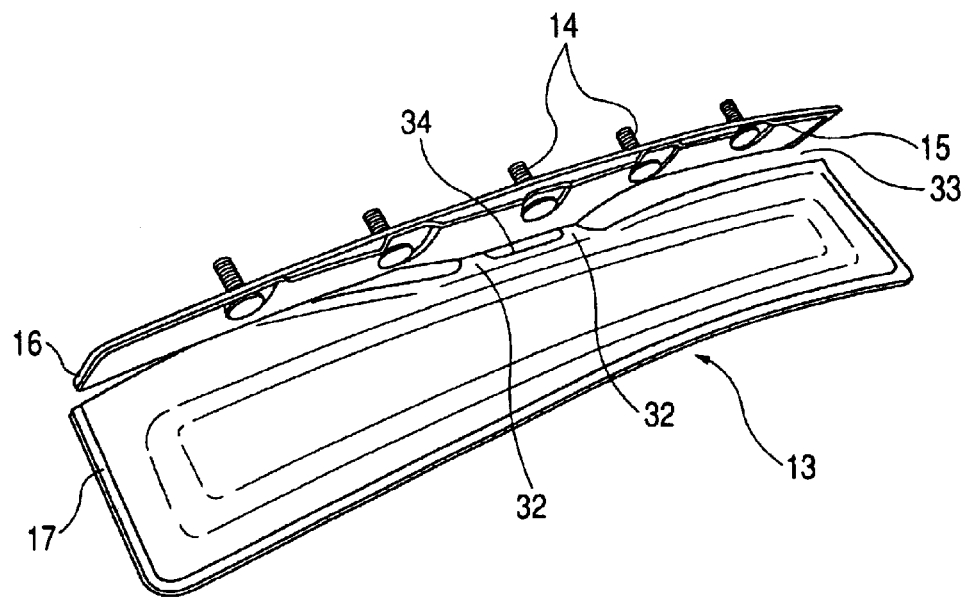
FIG. 5 is a perspective view of the door member in FIG. 4 and viewed from an upper side.

In the conventional operation mode of the inflator 21, the second hinge portion 32 is bent in a stage where the inflation pressure of the air bag body is lower than the predetermined value, and the formation of the inflation opening in the air bag lid portion 5 is started. When the inflation pressure of the air bag body then reaches a predetermined higher value, the first hinge portion 30 is bent, and the first hinge portion 30 and the second hinge portion 32 cooperate to form the predetermined inflation opening in the air bag lid portion 5 as shown in FIGS. 4 and 5. By contrast, in the multi-stage operation mode of the inflator 21, the second hinge portion is bent by a low inflation pressure of the air bag body in the first gas ejection stage, and the formation of the inflation opening in the air bag lid portion 5 is started. Even when a low inflation pressure of the air bag body in the second gas ejection stage is applied, the first hinge portion 30 is not substantially bent, and a predetermined inflation opening is formed by only the second hinge portion 32.

Embodiment 2

Figure 6:
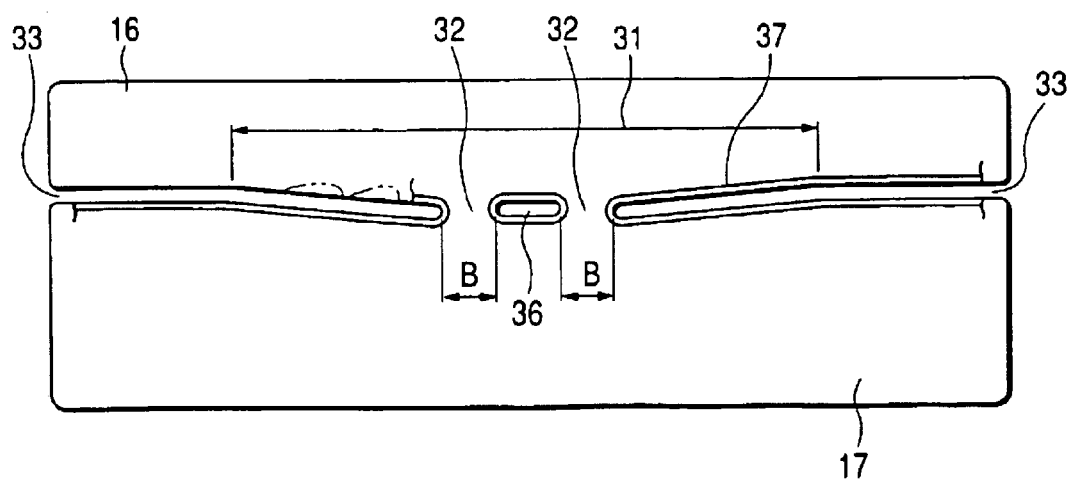
FIG. 6 is a schematic plan view of Embodiment 2 of the invention.

FIG. 6 shows Embodiment 2 of the invention. In the embodiment, the flexural rigidity of a first hinge portion 31 is set by, in place of the bending length C in Embodiment 1, a gradually expanded portion 37 which is expanded in a tapered manner in the lateral width direction of the door member 13.

The gradually expanded portion 37 may be formed into a step-like shape instead of the tapered shape.

Embodiment 3

Figure 7:
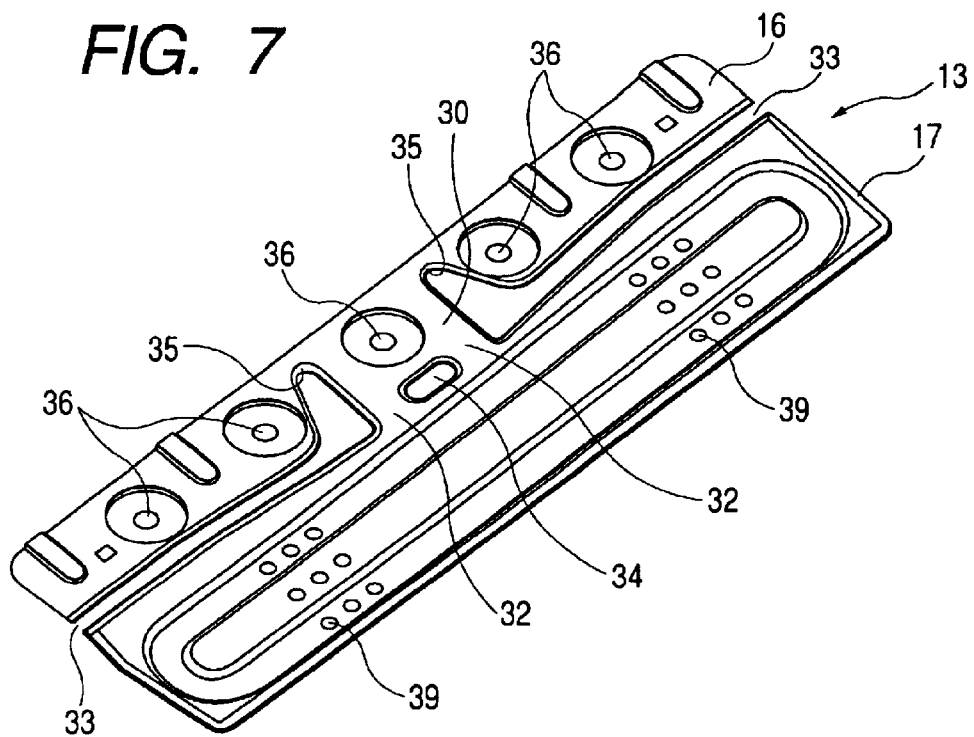
FIG. 7 is a perspective view of a door member in Embodiment 3 of the invention.

FIG. 7 shows Embodiment 3 of the invention. In the embodiment, the weakened portion (in Embodiment 3, plural holes are opened, but the weakened portion in the invention is not restricted to holes, and may be configured by, for example, reducing the thickness of only the side areas of the door member 13, or omitting formation of beads for improving the rigidity on the door member 13, only in the side areas) 39 in the invention are disposed in both the side areas of the door portion 17 of the door member 13.

According to Embodiment 3 which is configured as described above, when the center area of the door portion 17 is pressed more strongly by the inflated air bag body than the side areas, the door portion 17 is bent in the weakened portions 39 disposed in both the sides of the door portion, whereby stress concentration in the second hinge portion 32 which is in the center area of the door member 13 is relaxed. Therefore, the embodiment is effective in the case where the lateral width of the door portion 17 is particularly large.

Embodiment 4

Figure 8:
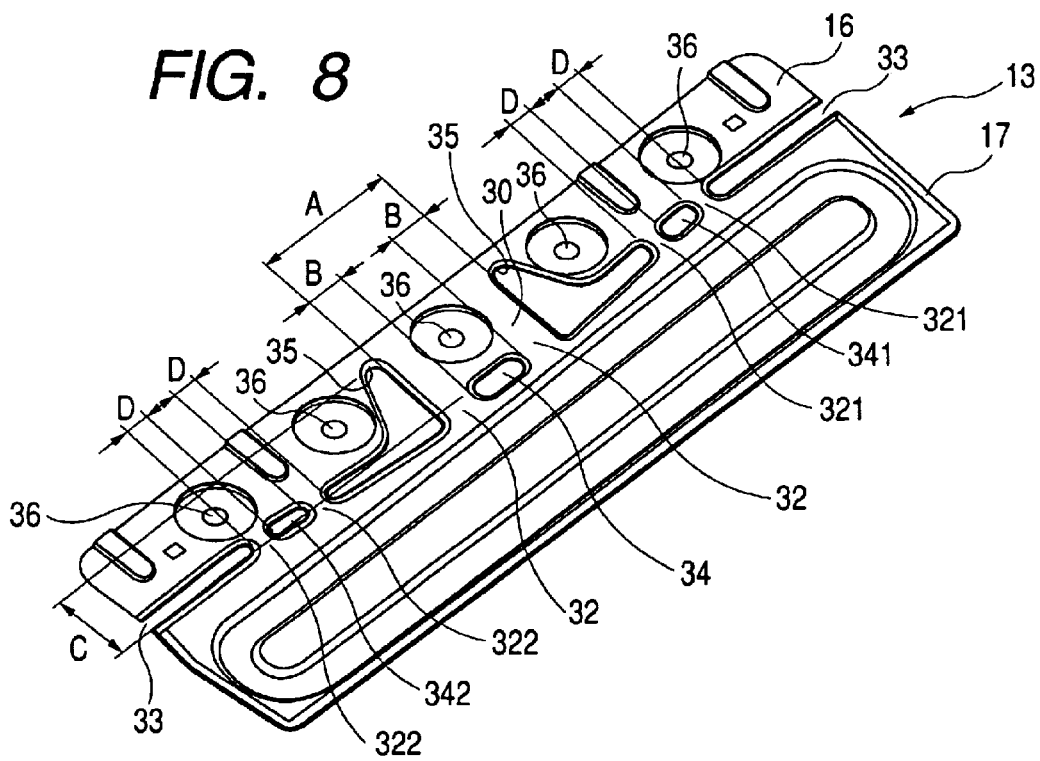
FIG. 8 is a perspective view of a door member in Embodiment 4 of the invention.

FIG. 8 shows Embodiment 4 of the invention. In the embodiment, second hinge portions 321 and 322 are formed also in the side areas of the door member 13, respectively, in addition to the second hinge portion 32 disposed in the center area of the door member 13. The second hinge portions 321 and 322 are set to have a width (the dimension D) which is approximately equal to or slightly smaller than the width (the dimension B) of the second hinge portion 32. The reference numerals 341 and 342 denote oblong holes which are similar to the oblong holes 34, and which are formed between the second hinge portions 321 or 322. Alternatively, two or more oblong holes 341 and 342 may be formed to form three or more second hinge portions 321 and 322.

According to Embodiment 4 of the invention which is configured as described above, even when the center area of the door portion 17 is pressed more strongly by the inflated air bag body than the side areas, the whole of the door portion is caused to perform hinge rotation by the second hinge portions 321 and 322 disposed in both the side areas of the door member 13. Therefore, it is possible to prevent stress from concentrating only in the second hinge portion 32 in the center area of the door member 13. Therefore, the embodiment is effective in the case where the lateral width of the door portion 17 is particularly large.

As described above, according to the first aspect of the invention, the simple hinge structure can cope with both the conventional operation mode and the multi-stage operation mode of the inflator.

According to the second aspect of the invention, the axis-to-axis distance between hinge axes of the first and second hinge portions is increased by the recess which is formed in the basal area of the hinge portion, thereby allowing a required flexural rigidity to be ensured in the hinge portion.

According to the third aspect of the invention, since the first hinge portion is formed into a tapered shape which is inclined toward the side of the door member fixing end as moving from the second hinge portion in the lateral width direction of the door member, it is possible to ensure the flexural rigidity of the first hinge portion by a part in the vehicle's width direction.

According to the fourth aspect of the invention, since the weakened portion is disposed in both the sides of the door portion of the door member, stress concentration due to rotation of the door member and in the second hinge portion which is in the center area of the door member can be relaxed.

According to the fifth aspect of the invention, since the second hinge portion is disposed in each of the center area and both the side areas of the door member, it is possible to attain a practically beneficial effect that stress due to rotation of the door member can be prevented from concentrating only in the second hinge portion which is in the center area.

What is claimed is:

1. A vehicular air bag device, comprising:

an air bag body;

an air bag lid portion;

a hinge portion; and a door member disposed on a rear face of said air bag lid portion and pressed by an inflation pressure of said air bag body to be swung via said hinge portion to form an inflation opening in said air bag lid portion, wherein said hinge portion comprises a first hinge portion, and a second hinge portion disposed on a door member open-end side of said first hinge portion;

wherein said second hinge portion is bent in a stage where the inflation pressure of said air bag body is lower than a predetermined value to cause formation of said inflation opening to be started; and wherein said first hinge portion has a flexural rigidity greater than said second hinge portion.

2. The vehicular air bag device according to claim 1, wherein said first hinge portion is tapered so as to be inclined toward a side of a fixing end of said door member in a direction along said second hinge portion in a lateral width direction of said door member.

3. The vehicular air bag device according to claim 1, wherein a weakened portion is disposed in each of both sides of a door portion of said door member.

4. The vehicular air bag device according to claim 1, wherein said second hinge portion is disposed in each of a center area and two side areas of said door member.

5. The vehicular air bag device according to claim 1, wherein said first hinge portion only bends when the inflation pressure of said air bag body is at least the predetermined value.

6. The vehicular air bag device according to claim 1, wherein at least a part of each of the first and second hinge portions themselves bend.

7. The vehicular air bag device according to claim 6, wherein the first and second hinge portions themselves bend in response to two different levels of inflation pressure, respectively.

8. The vehicular air bag device according to claim 1, wherein the predetermined value is an operational value at which the air bag operates.

9. The vehicular air bag device according to claim 1, wherein the first and second hinge portions are integrally formed.

10. A vehicular air bag device comprising:
an air bag body;
an air bag lid portion;
a hinge portion; and
a door member disposed on a rear face of said air bag lid portion and pressed by an inflation pressure of said air bag body to be swung via said hinge portion to form an inflation opening in said air bag lid portion;
wherein said hinge portion comprises a first hinge portion, and a second hinge portion disposed on a door member open-end side of said first hinge portion;
wherein said second hinge portion is bent in a stage where the inflation pressure of said air bag body is lower than a predetermined value to cause formation of said inflation opening to be started, and
wherein said vehicular air bag device further comprises a portion defining a recess which increases an axis-to-axis distance between hinge axes of said first and second hinge portions, said recess being formed in a basal area of said first hinge portion.

* * * * *